(12) United States Patent
Campbell et al.

(10) Patent No.: US 10,126,183 B2
(45) Date of Patent: Nov. 13, 2018

(54) ACTUATOR FOR FORCE SENSOR AND METHOD OF ASSEMBLING A FORCE-SENSING SYSTEM

(71) Applicant: NextInput, Inc., San Jose, CA (US)

(72) Inventors: Ian Campbell, San Jose, CA (US); Ryan Diestelhorst, Sunnyvale, CA (US); Jeremy Crank, Fremont, CA (US)

(73) Assignee: NEXTINPUT, INC., Mountain View, CA (US)

( * ) Notice: Subject to any disclaimer, the term of this patent is extended or adjusted under 35 U.S.C. 154(b) by 0 days.

(21) Appl. No.: 15/486,632

(22) Filed: Apr. 13, 2017

(65) Prior Publication Data

US 2017/0299448 A1 Oct. 19, 2017

Related U.S. Application Data

(60) Provisional application No. 62/322,592, filed on Apr. 14, 2016, provisional application No. 62/350,859, filed on Jun. 16, 2016.

(51) Int. Cl.
*G01L 1/04* (2006.01)
*G06F 3/041* (2006.01)

(52) U.S. Cl.
CPC ............... *G01L 1/04* (2013.01); *G06F 3/041* (2013.01); *G06F 2203/04103* (2013.01); *G06F 2203/04105* (2013.01)

(58) Field of Classification Search
CPC . G06F 2203/04105; G06F 2203/04103; G06F 3/041; G01L 1/04
USPC ...................................................... 73/862.636
See application file for complete search history.

(56) References Cited

U.S. PATENT DOCUMENTS

| 4,935,977 | A | * | 6/1990 | Yamada | A47C 23/06 267/148 |
|---|---|---|---|---|---|
| 6,769,969 | B1 | * | 8/2004 | Duescher | B24B 1/00 451/287 |
| 8,125,454 | B2 | * | 2/2012 | Kong | G06F 3/045 345/173 |
| 2016/0354589 | A1 | * | 12/2016 | Kobayashi | A61M 37/0015 |

* cited by examiner

*Primary Examiner* — Max Noori
(74) *Attorney, Agent, or Firm* — Meunier Carlin & Curfman LLC

(57) ABSTRACT

An example actuator device for a force sensor is described herein. The device can include a device body, a force concentrator element, an overload protection element, one or more legs, and an attachment layer for attaching the device to a substrate. An example method for assembling a force sensing system is also described herein. Further, an example method for protecting a force sensor from excessive forces or displacement is described herein.

15 Claims, 2 Drawing Sheets

ACTUATOR FOR FORCE SENSOR AND METHOD OF ASSEMBLING A FORCE-SENSING SYSTEM

CROSS-REFERENCE TO RELATED APPLICATIONS

This application claims the benefit of U.S. provisional patent application No. 62/322,592, filed on Apr. 14, 2016, and entitled "ACTUATOR FOR FORCE SENSOR AND METHOD OF ASSEMBLING A FORCE-SENSING SYSTEM," and U.S. provisional patent application No. 62/350,859, filed on Jun. 16, 2016, and entitled "ACTUATOR FOR FORCE SENSOR AND METHOD OF ASSEMBLING A FORCE-SENSING SYSTEM," the disclosures of which are expressly incorporated herein by reference in their entireties.

BACKGROUND

Touch-sensitive interfaces have been widely employed in electronic devices, particularly in consumer electronic devices. A variety of touch-sensitive technologies, including resistive, capacitive, surface acoustic wave, optical, etc., are known in the art. These touch-sensitive technologies can be used to sense when and where an operator makes contact with the touch-sensitive interface. This information can be used to control operations of the consumer electronic devices. The addition of force-sensitivity to a touch-sensitive device can add additional control dimensions that can be very useful, but mechanical integration can be challenging. This patent describes the mechanical integration of force sensors into a touch-sensitive device using mechanical actuators.

SUMMARY

An example mechanical actuator device for force-sensitive electronic devices is described herein. The device can include a deformable top surface configured to receive force from a touch surface.

Additionally, the actuator device can further include a force-concentrating feature (e.g., a force concentrator element) configured to concentrate the received force onto the force sensor.

Additionally, the actuator device can further include a fastening feature that locates and attaches the actuator device to a substrate near the force sensor.

Additionally or alternatively, the fastening feature can be an attachment layer such as an adhesive layer configured to bond with the substrate.

Additionally or alternatively, the fastening feature can be an attachment layer such as a solder pad configured to re-flow solder to the substrate.

Additionally, the actuator device can further include an elastic component above the deformable top surface. The elastic component can attach to the deformable top surface of the actuator device and/or to the touch surface of the force-sensitive electronic device. The elastic component can compress upon the application of force on the touch surface, providing a preload force to the force sensor when the touch surface is assembled into an assembly.

Additionally, the actuator device can further include an overload protection element configured to limit displacement of the deformable top surface. The overload protection element can prevent excessive deformation of the elastic component during a touch event in order to protect the force sensor from excessive forces. The overload protection element can also prevent excessive displacement of the touch surface during a touch event in order to protect the force sensor from excessive forces.

Additionally, the actuator device can include a gap between the touch surface and the overload protection element, which prevents excessive displacement of the touch surface during a touch event and the touch surface, such that if excessive displacement does occur, the gap will close, and the touch surface, or an additional component thereon, comes into contact with the mechanism to prevent excessive displacement of the touch surface.

Alternatively or additionally, the actuator device can include one or more spring elements that are integrated with the deformable surface.

An example method for attaching the actuator device to a substrate is described herein. The method can include pick and placing the actuator device in proximity to the force sensor. Additionally, a bonding material can be used to attach the actuator device to the substrate. Additionally or alternatively, a re-flow solder process can be used to attach the actuator device to the substrate. Additionally or alternatively, a re-flow solder process can be used to align both the actuator device and the force sensor.

An example method for assembling a force-sensing system is described herein. The method can include placement of one or more force sensors onto a substrate. Additionally, the method can include placement of one or more actuator devices onto a substrate. Additionally, the method can include placement of an elastic component onto a touch surface or other surface designed to receive an external force. Additionally, the method can include a step to affix the touch surface above the actuator device, such that the elastic component undergoes compression, which in turn transmits a preload force through the actuator to the force sensor.

Another example actuator device for a force sensor is described herein. The actuator device can include a deformable surface configured to transmit forces to the force sensor, a force concentrator element configured to concentrate forces on the force sensor, one or more legs extending from the deformable surface, one or more spring elements integrated with the deformable surface, and an attachment layer for attaching the actuator device to a substrate.

Another method for assembling a force sensing system is described herein. The method can include attaching a force sensor to a substrate, and attaching an actuator device to a substrate. The actuator device can include a frame configured to align the actuator device with the force sensor and one or more spring elements. The method can further include attaching a touch surface to a force-sensitive device body, where attaching the touch surface to the force-sensitive device body compresses the one or more spring elements and applies a preload force to the actuator device, which in turn applies a preload force to the force sensor.

Additionally or alternatively, the method of assembling a force sensing system can include placement of an elastic component onto the actuator device.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Figure 1:
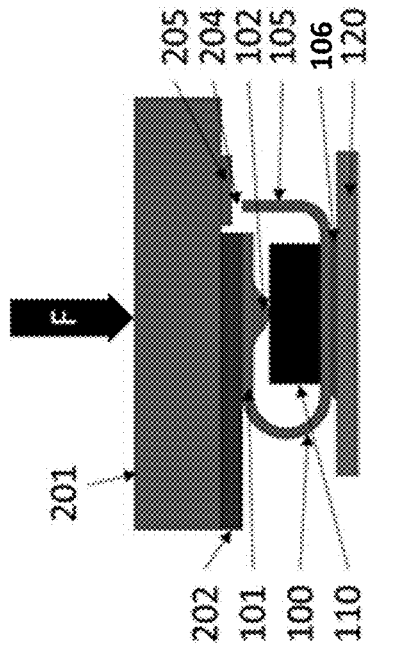
FIG. 1 is an isometric view of an example configuration of the actuator device.

Referring now to FIG. 1, an example actuator device 100 for a force-sensing system is described. The actuator device 100 can include a deformable surface 101 for receiving force, a force-concentrating feature 102 (e.g., a force concentrator element) to focus or concentrate force onto a force sensor 110, a device body 103 to support the deformable surface 101 and force-concentrating feature 102, one or more legs 104, an overload protection element 105, and an attachment layer 106 to attach the actuator device 100 to a substrate 120. In some implementations, the force-concentrating feature 102 can be a boss protruding from the deformable surface 101. This disclosure contemplates that the force-concentrating feature 102 makes contact with, and applies force to, the force sensor 110. The force-concentrating feature 102 can be shaped to focus or concentrate force onto the force sensor 110. As shown in FIG. 1, the force-concentrating feature 102 can have a rounded shape. It should be understood that the force-concentrating feature 102 of FIG. 1 is provided only as an example and that it can have other geometry/shapes.

The force sensor 110 can be a microelectromechanical ("MEMS") sensor. The force sensor 110 can be designed to provide overload protection. For example, the force sensor 110 can optionally be a MEMS sensor as described in U.S. Pat. No. 9,487,388, issued Nov. 8, 2016 and entitled "Ruggedized MEMS Force Die," U.S. Pat. No. 9,493,342, issued Nov. 15, 2016 and entitled "Wafer Level MEMS Force Dies," U.S. Patent Application Publication No. 2016/0332866 to Brosh et al., filed Jan. 13, 2015 and entitled "Miniaturized and ruggedized wafer level mems force sensors," or U.S. Pat. No. 9,032,818, issued May 19, 2015 and entitled "Microelectromechanical Load Sensor and Method of Manufacturing the Same," the disclosures of which are incorporated by reference in their entireties.

The actuator device 100 can be picked and placed over and around the force sensor 110, which is bonded to the substrate 120 such as a rigid or flexible printed circuit board (PCB). It should be understood that a PCB is provided only as an example substrate. The substrate 120 can be incorporated into a force-sensing system such as an electronic device. This disclosure contemplates that electronic devices include, but are not limited to, smart phones, tablet computers, and other consumer electronic devices. The device body 103 can be a frame configured to align the actuator device 100 with the force sensor 110. Optionally, the frame can align the force-concentrating feature 102 with a center of the force sensor 110. For example, the device body 103 can include one or more elongate base elements 130. As shown in FIG. 1, the device body 103 has a plurality of base elements 130, which are arranged on opposite sides of the force sensor 110, extending therefrom. The device body 103 and the base elements 130 form the frame. This disclosure contemplates that the spacing between the device body 103 and/or the base elements 130 can be selected to accurately guide pick and placement of the actuator device 100 with respect to the force sensor 110. The base elements 130 can at least partially surround the force sensor 110 as shown in FIGS. 1 and 3-6 such that the actuator device 100 is aligned with the force sensor 110 (e.g., aligned with a center thereof) when placed on the substrate 120. The base elements 130 can support the actuator device 100, e.g., the actuator device 100 can support itself over the force sensor 110. In FIG. 1, the device body 103 and the base elements 130 provide a frame surrounding three sides of the force sensor 110. It should be understood that this geometry/design is provided only as an example. Additionally, as shown in FIG. 1, a leg 104 extends between the deformable surface 101 and each of the base elements 130. The legs 104 in FIG. 1 are bent or curved. It should be understood that the shape/geometry of the legs 104 shown in FIG. 1 is provided only as an example.

Figure 2:
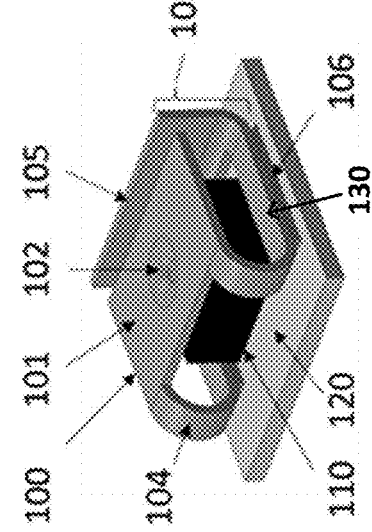
FIG. 2 illustrates a cross section of an example arrangement of the actuator device of FIG. 1 together with an elastic component and a touch surface to receive forces within a force-sensing system (e.g., an electronic device).

Referring now to FIG. 2, the actuator device 100 is positioned between a touch surface 201 configured to receive one or more external forces "F" (shown with an arrow in FIG. 2), an elastic component 202, and a force sensor 110. The touch surface 201 can be a touch surface of an electronic device, for example. The elastic component 202 (e.g., a rubber layer) is arranged between the touch surface 201 and the actuator device 100/force sensor 110 and provides for mechanical planarity tolerances, preload, and/or shock absorption. For example, the elastic component 202 can ensure that mechanical contact is made with a plurality of actuator devices/force sensors. A bonding layer holds the actuator in place next to the force sensor 110 on a substrate 120. An attachment layer 106 holds the actuator device 100 onto the substrate 120. An overload protection element 105 prevents excessive displacement of the touch surface 201, which also prevents excessive forces from reaching the force sensor 110. For example, a gap 204 between the touch surface 201 and the overload protection element 105 is configured to close when one or more excessive forces F cause excessive displacement of the touch surface 201. As shown in FIG. 2, the overload protection element 105 extends from the device body 103. The height of the overload protection element 105 can be selected to limit deflection of the deformable surface 101, e.g., the overload protection element 105 prevents mechanical failure. A hard material 205 (e.g., plastic) can be arranged between the touch surface 201 and the overload protection element 105 to protect the touch surface 201 from excessive stress. This disclosure contemplates that the overload protection provided by the overload protection element 105 is in addition to any overload protection that may be provided by the force sensor 110 itself.

Figure 3:
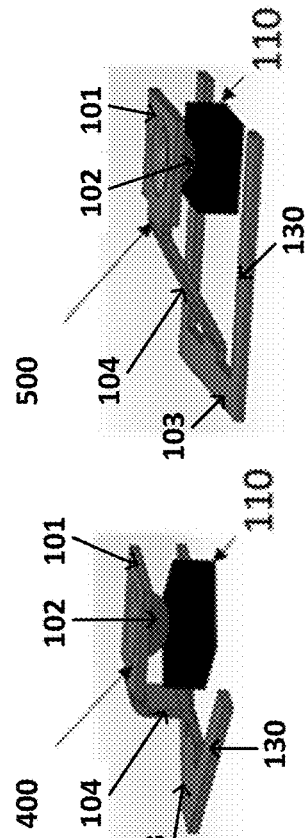
FIG. 3 illustrates an alternative design of the actuator device.

Referring now to FIG. 3, another example actuator device 300 is shown. The actuator device 300 includes a deformable surface 101 for receiving force, a force-concentrating feature 102 to focus or concentrate force onto a force sensor 110, a device body 103 to support the deformable surface 101 and force-concentrating feature 102, and a leg 104. Similarly as described above, the actuator device 300 can be attached to a substrate such as a PCB, for example, using an adhesive layer. Additionally, as shown in FIG. 3, the device body 103 includes one or more elongate base elements 130. For example, the device body 103 has a plurality of base elements 130, which are arranged on opposite sides of the force sensor 110, extending therefrom. The device body 103 and the base elements 130 form the frame. This disclosure contemplates that the spacing between the device body 103 and/or the base elements 130 can be selected to accurately guide pick and placement of the actuator device 300 with respect to the force sensor 110. The base elements 130 can support the actuator device 300, e.g., the actuator device 300 can support itself over the force sensor 110. The actuator device 300 of FIG. 3 includes only one leg 104 (as opposed to a plurality of legs in FIGS. 1 and 2). The leg 104 extends between the deformable surface 101 and the device body 103. As shown in FIG. 3, the leg 104 includes a plurality of sections forming a gradually bent section extending between the deformable surface 101 and the device body 103. Unlike FIG. 1, the actuator device 300 of FIG. 3 does not include an overload protection element.

Figure 4:
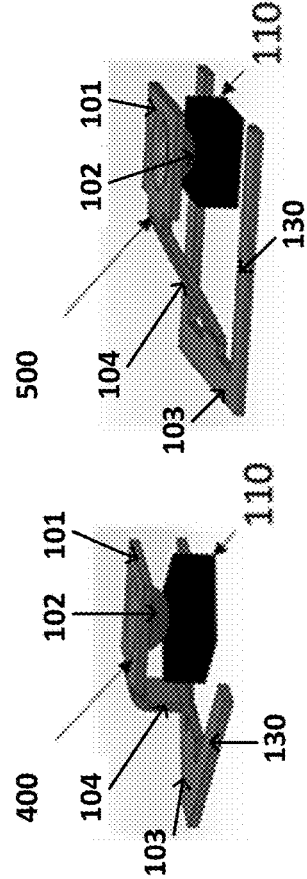
FIG. 4 illustrates an alternative design of the actuator device.

Referring now to FIG. 4, another example actuator device 400 is shown. The actuator device 400 includes a deformable surface 101 for receiving force, a force-concentrating feature 102 to focus or concentrate force onto a force sensor 110, a device body 103 to support the deformable surface 101 and force-concentrating feature 102, and a leg 104. Similarly as described above, the actuator device 400 can be attached to a substrate such as a PCB, for example, using an adhesive layer. Additionally, as shown in FIG. 4, the device body 103 includes one or more elongate base elements 130. For example, the device body 103 has a plurality of base elements 130, which are arranged on opposite sides of the force sensor 110, extending therefrom. The device body 103 and the base elements 130 form the frame. This disclosure contemplates that the spacing between the device body 103 and/or the base elements 130 can be selected to accurately guide pick and placement of the actuator device 400 with respect to the force sensor 110. The base elements 130 can support the actuator device 400, e.g., the actuator device 400 can support itself over the force sensor 110. The actuator device 400 of FIG. 4 includes only one leg 104 (as opposed to a plurality of legs in FIGS. 1 and 2). The leg 104 extends between the deformable surface 101 and the device body 103. As shown in FIG. 4, the leg 104 includes a plurality of sections forming a gradually bent section extending between the deformable surface 101 and the device body 103. Unlike FIG. 1, the actuator device 400 does not include an overload protection element.

Figure 5:
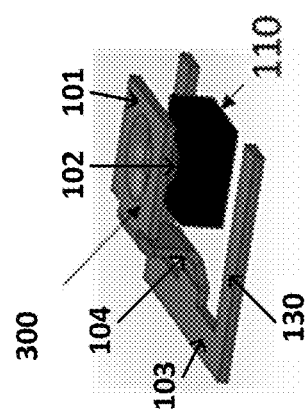
FIG. 5 illustrates an alternative design of the actuator device.

Referring now to FIG. 5, another example actuator device 500 is shown. The actuator device 500 includes a deformable surface 101 for receiving force, a force-concentrating feature 102 to focus or concentrate force onto a force sensor 110, a device body 103 to support the deformable surface 101 and force-concentrating feature 102, and a leg 104. Similarly as described above, the actuator device 500 can be attached to a substrate such as a PCB, for example, using an adhesive layer. Additionally, as shown in FIG. 5, the device body 103 includes one or more elongate base elements 130. For example, the device body 103 has a plurality of base elements 130, which are arranged on opposite sides of the force sensor 110, extending therefrom. The device body 103 and the base elements 130 form the frame. This disclosure contemplates that the spacing between the device body 103 and/or the base elements 130 can be selected to accurately guide pick and placement of the actuator device 500 with respect to the force sensor 110. The base elements 130 can support the actuator device 500, e.g., the actuator device 500 can support itself over the force sensor 110. The actuator device 500 of FIG. 5 includes only one leg 104 (as opposed to a plurality of legs in FIGS. 1 and 2). The leg 104 extends between the deformable surface 101 and the device body 103. As shown in FIG. 5, the leg 104 includes a plurality of sections forming a bent section extending between the deformable surface 101 and the device body 103. Unlike FIG. 1, the actuator device 500 does not include an overload protection element. The leg 104 of FIG. 5 includes less section and a more elongated, straight section as compared to FIGS. 3 and 4.

Figure 6:
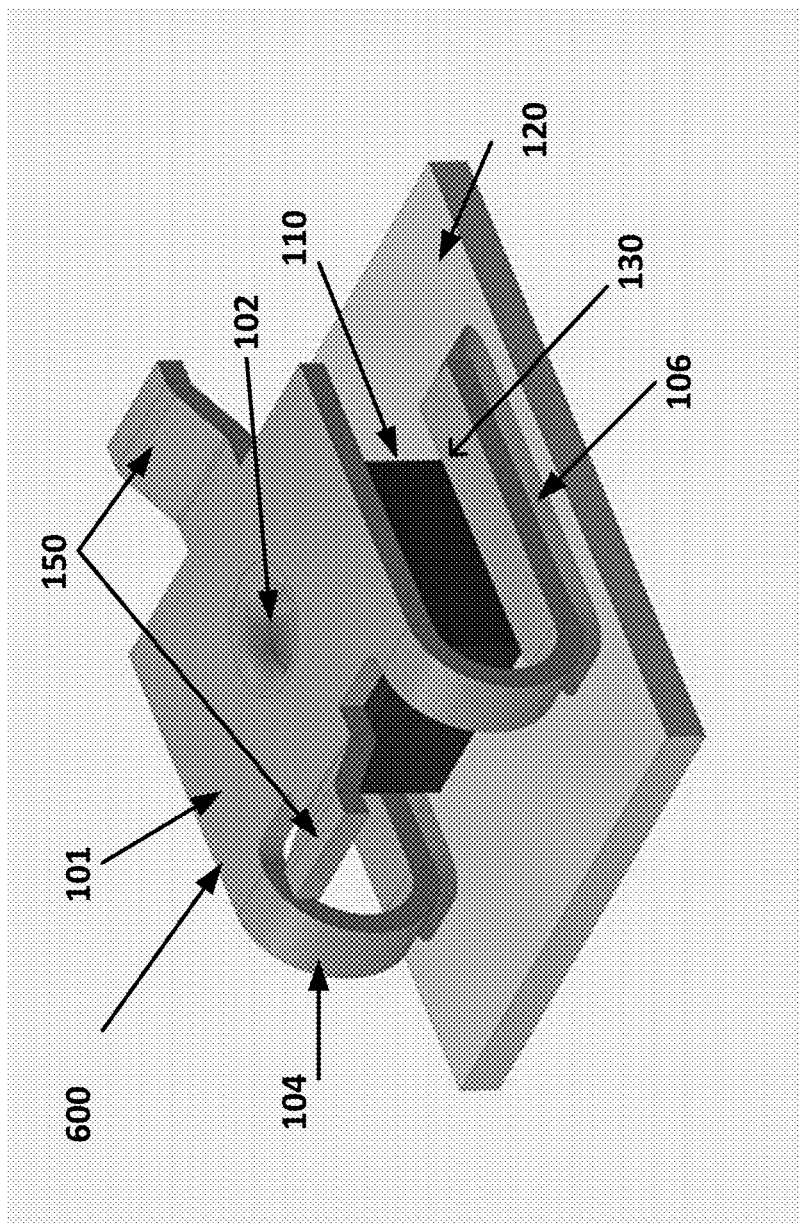
FIG. 6 illustrates an alternative design of the actuator device.

Referring now to FIG. 6, the actuator device 600 according to another implementation is shown. The actuator device 600 can include the deformable surface 101 for receiving force, the force-concentrating feature 102 (e.g., a force concentrator element) to focus or concentrate force onto the force sensor 110, one or more legs 104, and the attachment layer 106 to attach the actuator device 600 to the substrate 120. These features are described above and therefore not described in further detail below. Similar to FIG. 1, a leg 104 extends between the deformable surface 101 and each of a plurality of elongate base elements 130. The spring elements 150 extend from the deformable surface 101. Optionally, the spring elements 150 can be integral with the deformable surface 101.

The actuator device 600 can include one or more spring elements 150 as shown in FIG. 6. As described above, the actuator device 600 can be picked and placed over and around the force sensor 110, which is bonded to the substrate 120. The device body of the actuator device 600 can be a frame configured to align the actuator device 600 with the force sensor 110. The frame can include one or more elongate base elements 130 as described above. Using alignment features in proximity to the force sensor 110, such as the frame of the actuator device 600 for example, is advantageous since it is difficult to control tolerances of mechanical features of the greater force-sensitive device. Thus, using the actuator device 600 for alignment, it is possible to more accurately align the force concentrating feature 102 with the center of the force sensor 110. Additionally, by including one or more spring elements 150 in the actuator device 600, it is possible to eliminate the need for the elastic component (e.g., elastic component 202 of FIG. 2). In particular, the one or more spring elements 150 can provide for mechanical planarity tolerances, preload, and/or shock absorption. Optionally, in some implementations, the actuator device 600 and spring elements 150 can be formed from a metal material. This disclosure contemplates that metal spring elements can provide improved preload and/or shock absorption as compared to a rubber or polymer elastic layer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An actuator device for a force sensing system, comprising:
   a force sensor;
   a deformable surface configured to transmit forces to the force sensor;
   a force concentrator element configured to concentrate forces on the force sensor;
   a device body configured to support the deformable surface and the force concentrator element;
   one or more legs extending between the device body and the deformable surface; and
   an attachment layer for attaching the actuator device to a substrate.

2. The actuator device of claim 1, wherein the device body is a frame configured to align the actuator device with the force sensor.

3. The actuator device of claim 2, wherein the device body further comprises one or more elongate base elements.

4. The actuator device of claim 3, wherein the attachment layer is arranged on at least one of the one or more elongate base elements.

5. The actuator device of claim 1, wherein the device body comprises a polymer material.

6. The actuator device of claim 1, wherein the device body comprises a metal material.

7. The actuator device of claim 1, wherein the device body comprises an elastomeric material.

8. The actuator device of claim 1, wherein the attachment layer comprises an adhesive material.

9. The actuator device of claim 1, wherein the attachment layer comprises a solder material.

10. The actuator device of claim 1, further comprising an overload protection element configured to limit displacement of the deformable surface.

11. The actuator device of claim 1, further comprising one or more spring elements, wherein the one or more spring elements are integrated with the deformable surface.

12. A force-sensitive device, comprising:
    a touch surface; and
    an actuator device of claim 1, wherein the actuator device further comprises an overload protection element configured to limit displacement of the deformable surface, wherein a gap is arranged between the touch surface and the actuator device, and wherein the gap is configured to close upon excessive displacement as a result of excessive external forces on the touch surface.

13. A method for assembling a force sensing system comprising:
    attaching a force sensor to a substrate;
    attaching an actuator device to the substrate, wherein the actuator device comprises a frame configured to align the actuator device with the force sensor;
    attaching an elastic component to a touch surface; and
    attaching the touch surface to a force-sensitive device body, wherein attaching the touch surface to the force-sensitive device body compresses the elastic component and applies a preload force to the actuator device, and wherein the actuator device applies a preload force to the force sensor.

14. A method for assembling a force sensing system comprising:
    attaching a force sensor to a substrate;
    attaching an actuator device to the substrate, wherein the actuator device comprises a frame configured to align the actuator device with the force sensor and one or more spring elements; and
    attaching a touch surface to a force-sensitive device body, wherein attaching the touch surface to the force-sensitive device body compresses the one or more spring elements of the actuator device and applies a preload force to the actuator device, and wherein the actuator device applies a preload force to the force sensor.

15. The actuator device of claim 1, wherein the force sensor is a microelectromechanical (MEMS) force sensor.

* * * * *